United States Patent [19]

Gray

[11] Patent Number: 4,937,101

[45] Date of Patent: Jun. 26, 1990

[54] PREREACTED INHIBITOR POWDER FOR CARBON-CARBON COMPOSITES

[75] Inventor: Paul E. Gray, La Costa, Calif.

[73] Assignee: Rohr Industries, Inc., Chula Vista, Calif.

[21] Appl. No.: 268,028

[22] Filed: Nov. 7, 1988

[51] Int. Cl.$^5$ .............................................. B05D 3/02
[52] U.S. Cl. .................... 427/228; 427/370; 427/419.1; 427/419.2; 427/419.7
[58] Field of Search .................. 427/228, 419.1, 419.2, 427/419.7, 370

[56] References Cited

U.S. PATENT DOCUMENTS

| | | | |
|---|---|---|---|
| 3,682,686 | 8/1972 | Nakumura | 427/228 |
| 4,101,354 | 7/1978 | Shaffer | 427/228 |
| 4,119,189 | 10/1978 | Ehrenreich | 427/228 |
| 4,131,708 | 12/1978 | Moores et al. | 427/228 |
| 4,321,298 | 3/1982 | Shaffer | 427/228 |
| 4,339,021 | 7/1982 | Kosuda | 427/228 |

Primary Examiner—Janyce Bell
Attorney, Agent, or Firm—Patrick J. Schlesinger; Jay M. Cantor

[57] ABSTRACT

The disclosure relates to a method of forming carbon-carbon composites wherein prereaction of the filler ingredients takes place prior to the prepregging operation, thereby ensuring that the sealant phase is both homogeneous and unsegregated on a microscopic scale. Composites prepared from several constituent inhibitor powders often have one inhibitor component segregated within the carbon fabric and fiber bundles during compaction, debulking and press curing. Composites prepared from prereacted powders have inhibitor constituents mixed on an atomic scale. Thus, the oxide sealant which forms from the prereacted particulate filler has an optimized composition with all of the desirable qualities, such as level viscosity, good wetting, low water solubility, low reactivity with the carbon fibers and carbon matrix during graphitization and low reactivity with the chemically vapor deposited coating.

10 Claims, No Drawings

PREREACTED INHIBITOR POWDER FOR CARBON-CARBON COMPOSITES

BACKGROUND OF THE INVENTION

1. Field of the Invention

This invention relates to carbon-carbon composites and, more specifically, to carbon-carbon composites utilizing a filler powder to oxidize and seal cracks formed in the composites due to thermal expansion differences between the carbon-carbon and coating during high temperature thermal cycling.

2. Brief Description of the Prior Art.

Carbon-carbon technology is well known in various art areas, primarily in aerospace technology, for its ability to provide structures therefrom which display high strength relative to the structural weight. Carbon-carbon composites incorporate carbon (including graphite) fibers, which may be in the form of a cloth, in a carbon matrix to reinforce the matrix. Carbon-carbon composites are formed, for example, by impregnating carbon (including graphite) cloth with a carbon char-yielding material, such as, for example, a resin, layering plies of the impregnated carbon cloth one atop the other and then carbonizing the impregnated layered plies with the application of heat and pressure. A problem with such carbon-carbon structures is that, when subjected to high temperatures where appropriate oxidizing conditions exist, they have a tendency to oxidize. Furthermore, when such structures are subjected to thermal cycling, especially with high temperatures and large temperature gradients, small cracks may appear in the structures themselves or in any coatings applied thereto.

Current state of the art carbon-carbon composites display a lessening of this problem and have been rendered substantially more oxidation resistant by providing powders distributed throughout the carbon matrix to getter oxygen, form a sealant glass phase and seal cracks in an externally applied coating. An example of such prior art is provided in Ser. No. 06/805,887, filed Dec. 5, 1985 now U.S. Pat. No 4,892,790 and Ser. No. 07/081,126, filed Aug. 3, 1987 of Gray et al., now U.S. Pat. No, 4,795,677 both of which are continuations-in-part of Ser. No. 06/798,994, filed Nov. 18, 1985 now abandoned, which is a continuation in part of Ser. No. 06/676,985, filed Nov. 30, 1984, now abandoned, all of which are incorporated herein in their entirety by reference. These cracks are caused by a thermal expansion difference which exists between the carbon fibers, carbon cloth or substrate which have a relatively low coefficient of thermal expansion and the coating or matrix which has a relatively high coefficient of thermal expansion.

The sealant glasses which form due to oxidation of these powders or fillers are typically multi-component borate glasses. Therefore, in addition to some boride or boron, the composites contain other particulate fillers which provide the necessary ingredients to form the correct composition glass sealant. For example, within the $TiO_2$-$SiO_2$-$B_2O_3$ system, the $B_2O_3$ is mainly supplied by elemental boron and the $TiO_2$ and $SiO_2$ by combinations of SiC, $Ti_5Si_3$ and $TiB_2$. These fillers are added to the resin prior to prepregging the carbon or graphite cloth.

Composites made from multicomponent powder mixtures of the prior art as described above contain all of the essential ingredients for effective oxidation protection from a macroscopic point of view. However, from a microscopic point of view, the constituent powders are usually segregated. For this reason, during oxidation, these powders oxidize preferentially, forming a glass sealant which is heterogeneous or segregated on a microscopic scale.

SUMMARY OF THE INVENTION

In accordance with the present invention, the above noted problems of the prior art are minimized and there is provided a carbon-carbon composite wherein the glass sealant is substantially homogeneously distributed through the composite before and after reaction thereof.

Briefly, the above is accomplished by prereaction of the filler ingredients prior to the prepregging operation, thereby ensuring that the sealant phase is both homogeneous and unsegregated on a microscopic scale. Composites prepared from several constituent inhibitor powders often have one inhibitor component segregated within the carbon fabric and fiber bundles during compaction, debulking and press curing. Composites prepared from prereacted powders have inhibitor constituents mixed on an atomic scale. Thus, the oxide sealant which forms from the prereacted particulate filler has an optimized composition with all of the desirable qualities, such as level viscosity, good wetting, low water solubility, low reactivity with the carbon fibers and carbon matrix during graphitization and low reactivity with the chemically vapor deposited coating.

Loading efficiency is another reason for using prereacted oxidation inhibitor fillers. For example, if one uses $B_4C$ as a source of boron, the actual amount of usable boron is only 80% of the $B_4C$ added. Furthermore, the oxidation of $B_4C$ forms CO which must react with other carbonaceous material or escape into the atmosphere. Materials such as SiC are poor choices as a silicon source since they only have a 50% Si loading efficiency and SiC is itself inherently oxidation resistant. Traditionally, these materials were used because of their relative inertness with respect to carbon at high temperatures.

The preferred materials for use as the filler and antioxidants herein are specifically those set forth in the above noted application, which has been incorporated herein by reference, except that these materials will have been prereacted prior to prepregging the carbon fibers or cloth. In addition, the material $Si_2TiB_{14}$ is advantageous as a filler since it has 100% loading efficiency, is chemically inert with respect to carbon (melting point 2100° C.) and forms an optimized oxide sealant immediately upon oxidation.

Several methods can be utilized to prepare all prereacted filler powders. One method is to mix the ingredients in the correct molar proportions, heat the mixture until it is fully reacted and then grind or mill the material until the correct fineness is achieved. Another method, which typically results in very fine powders of high surface area, is to thermally decompose metal-containing gasses such as $B_2H_6$, $SiH_4$ and $TiCl_4$ in a furnace such that a fine "soot" or dust is produced. This "soot" or dust constitutes a vapor-deposited powder and is mixed on an atomic scale.

Ideally and preferably, a combination of the two above described methods or techniques is used since the particle size of the reacted powder is coarser and can be varied by grinding or milling while the particle size of the vapor deposited powder is usually colloidal size and somewhat fixed. The reacted powder provides the coarser particles while the co-deposited powder provides the fine colloidal particles necessary to keep the coarser particles in suspension in the prepregging resin.

In the case of the $SiO_2$-$TiO_2$-$B_2O_3$ sealant example herein, the requisite inhibitor can be prepared by solid state reaction of elemental boron, titanium and silicon at elevated temperatures of 1200° to 1700° C. Differential thermal analysis, DTA, is helpful in determining the optimum reaction temperature, since an exotherm will occur at the reaction temperature. Good premixing and dry powder blending is essential to obtain homogeneous alloys. Spray drying the blended powder is preferred for premixing of the $Si_2TiB_{14}$ alloy.

Preparation of the $Si_2TiB_{14}$ alloy from vapor phase decomposition can be achieved by mixing $B_2H_6$, $SiH_4$ and $TiCl_4$ in the correct molar ratios and then introducing the gasses into a heated reactor with excess hydrogen between 700° and 1500° C. The products of the reaction will be the $Si_2TiB_{14}$ alloy, HCl and $H_2$. This chemically vapor deposited powder is collected and then incorporated into the prepreg resin to provide the colloidal fraction of filler for prepregging into the carbon fibers or fabric as discussed hereinabove.

The alloy powder produced as noted above is mixed on an atomic scale so that the resultant oxide sealant has the correct rheology and wetting properties at the start of oxidation.

The mixed metal borides which form upon prereaction are thermally stable and inert with respect to the carbon fibers and matrix. Thus, the composites are less sensitive to overheating during processing.

Segregation of the fillers in the prepreg dip tank of the prior art is eliminated, preventing compositional changes in the prepreg. Likewise, segregation of the filler during curing of the laminate is eliminated. Non-uniform mixing of the fillers and resin is also eliminated.

DESCRIPTION OF THE PREFERRED EMBODIMENT

Example 1

40.7 weight percent Zr was mixed with 59.3 weight percent of boron powder. This ratio of particulates transforms upon complete oxidation to a composition with 86:14 molar ratio $B_2O_3$-$ZrO_2$ mix. This molar ratio is considered optimal for providing viscosity-leveling in a $B_2O_3$ binary system. These materials were processed in an inert atmosphere at 1700° C. for one hour and, after cooling, the product was ground to less than 10 microns. The resultant mixture was found to contain $ZrB_2$ and $ZrB_{12}$. Two parts by weight of the ground product were mixed with 3 parts by weight of SC-1008 phenolic resin having a resin solids content of 60 to 65 percent obtained from Monsanto Chemicals, St. Louis, Mo. in a high shear mixer to achieve homogeneity. This mix was then painted onto conventional carbon fiber cloth (T-300 PAN fibers) and the excess mix was removed with a flexible rubber roller, forming plies. The impregnated plies were then heated to 80° C. for 15 to 20 minutes to partially cure the resin and render the plies convenient to handle. The individual plies were laid up, one atop the other, to form a composite and loaded into a press with heated platens. The composition received the following heat/press schedule:

| Temperature Range (°C.) | Pressure Range (Kg/cm²) | Time (Hr.) |
|---|---|---|
| 22–80 | 17.5 | 1 |
| 80–90 | 17.5–53 | 1 |
| 90–180 | 53 | 1 |
| 180–200 | 53 | 1 |

The Composites were then restrained and carbonized in an inert atmosphere in a retort furnace. The composites were slowly heated at 10° to 20° C. per hour to 500° C., then rapidly at 60° C. to 100° C. per hour heated to 800° C. and then cooled by turning off the furnace power. Then, stabilization or high-temperature processing was performed in an inert atmosphere at 1700° C. for one hour. After cooling, the composites were given three impregnation, carbonization, graphitization cycles using the phenolic resin alone as an impregnant.

Using this processing procedure, an inhibitor loading level of about 65 weight percent of the carbon in the composite is realized for the inhibitor system calculated as the $ZrO_2$ and $B_2O_3$. This composite also contained from 10 to 20 volume percent porosity. At this inhibitor loading level, upon oxidation, there are ample $B_2O_2$-RO precursors to ultimately fill in all of the accessible matrix and interfiber porosity. The composite was machined into a block $2'' \times \frac{1}{4}'' \times \frac{1}{4}''$.

100 gm. of the phenolic resin used above was dissolved in 150 ml of ethyl alcohol, and a slurry was formed by adding 100 gm. of the prereacted powder. Approximately 0.250 gm. of slurry was painted onto the structure produced above, which had a surface area of about 2 $\frac{1}{8}$in². The structure was then dried for one hour at 100° C. Next, the structure was placed in an inert atmosphere and heated at a rate of about 0.5° C. per minute to 800° C. and maintained at 800° C. for 30 minutes and then cooled slowly. The structure was then overcoated by chemical vapor deposition with a 200 micron thick layer of silicon carbide.

Example 2

18.8 parts by weight of titanium powder, 22.0 parts by weight silicon powder and 59.2 parts by weight boron powder were mixed and heated and processed in the same manner and under the same conditions as set forth in Example 1 described hereinabove to provide the final composite.

Example 3

1 mole of $TiCl_4$, 2 moles of $SiCl_4$, 7 moles of $B_2H_6$ and 6 moles of hydrogen were fed into a heated reactor at 1000° C. The resultant "soot" was separated from the gas stream with a cyclone separator and the waste HCl was fed into a neutralizing water wash containing NaOH. Ten parts of the "soot" were then mixed with 90 parts of the prereacted powder. 40 parts of this mixture were then mixed with 60 parts of SC-1008 phenolic resin having a nominal resin solids content of 60 to 65 per cent. The procedure was then completed in the manner described in Example 1 hereinabove.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A method of providing an oxygen-resistant carbonous structure comprising the steps of:
   (a) providing a carbon char-yielding material;
   (b) reacting a material taken from the class consisting of boron and boron-containing compounds with a material taken from the class consisting of metals, metalloids and compounds thereof;
   (c) providing the reacted product of step (b) in particles of up to about 10 microns;
   (d) dispersing the reacted particles of step (c) substantially homogeneously in said char-yielding material; and
   (e) heating said char-yielding material of step (d) under pressure to carbonize said material of step (c).

2. The method of claim 1 wherein said char-yeilding material comprises carbonous matrix and carbonous fibers disposed within said matrix.

3. The method of claim 1 wherein the reaction product from reacting a material taken from the class consisting of boron and boron-containing compounds with a material taken from the class consisting of metals, metalloids and compounds thereof is present in an amount of from about 3 to about 40 mole percent of boron, calculated as boron oxide.

4. The method of claim 2 wherein said the reaction product from reacting a material taken from the class consisting of boron and boron-containing compounds with a material taken from the class consisting of metals, metalloids and compounds thereof is present in an amount of from about 3 to about 40 mole percent of boron, calculated as boron oxide.

5. The method of claim 1 further including the step of forming an outer refractory coating over the product of step (d).

6. The method of claim 2 further including the step of forming an outer refractory coating over the product of step (d).

7. The method of claim 4 further including the step of forming an outer refractory coating over the product of step (d).

8. The method of claim 1 wherein said material taken from the class consisting of metals, metalloids and compounds thereof is selected from the group consisting of Ti, Zr, Hf, Al, Y, Sc, La, Si, and Ce.

9. The method of claim 2 wherein said material taken from the class consisting of metals, metalloids and compounds thereof is selected from the group consisting of Ti, Zr, Hf, Al, Y, Sc, La, Si, and Ce.

10. The method of claim 7 wherein said material taken from the class consisting of metals, metalloids and compounds thereof is selected from the group consisting of Ti, Zr, Hf, Al, Y, Sc, La, Si, and Ce.

* * * * *